(12) United States Patent
Fleitmann et al.

(10) Patent No.: US 9,153,947 B2
(45) Date of Patent: Oct. 6, 2015

(54) WITHDRAWABLE UNIT FOR AN ELECTRIC SWITCHING DEVICE

(75) Inventors: Gregor Fleitmann, Kerpen (DE); Wolfgang Kutsche, Weilerswist (DE)

(73) Assignee: EATON ELECTRICAL IP GMBH & CO. KG, Schoenefeld (DE)

( * ) Notice: Subject to any disclaimer, the term of this patent is extended or adjusted under 35 U.S.C. 154(b) by 209 days.

(21) Appl. No.: 13/995,571

(22) PCT Filed: Dec. 21, 2011

(86) PCT No.: PCT/EP2011/073637
§ 371 (c)(1),
(2), (4) Date: Jun. 19, 2013

(87) PCT Pub. No.: WO2012/085116
PCT Pub. Date: Jun. 28, 2012

(65) Prior Publication Data
US 2013/0264178 A1 Oct. 10, 2013

(30) Foreign Application Priority Data
Dec. 21, 2010 (EP) .................................... 10196281

(51) Int. Cl.
*H02B 11/02* (2006.01)
*H02B 11/133* (2006.01)

(52) U.S. Cl.
CPC .............. *H02B 11/02* (2013.01); *H02B 11/133* (2013.01)

(58) Field of Classification Search
CPC ......... H01H 9/22; H01H 33/50; H01H 33/42; H02B 11/133

USPC .......... 200/43.14, 50.01, 50.17, 50.21, 50.23, 200/50.24, 50.02, 50.12, 50.26, 50.27
See application file for complete search history.

(56) References Cited

U.S. PATENT DOCUMENTS

| | | | | |
|---|---|---|---|---|
| 5,459,293 A | * | 10/1995 | Hodkin et al. | ............. 200/50.26 |
| 5,837,949 A | | 11/1998 | Green et al. | |
| 7,348,505 B2 | * | 3/2008 | Kashyap et al. | ........... 200/50.22 |
| 2008/0273293 A1 | | 11/2008 | Kozar et al. | |
| 2010/0118473 A1 | | 5/2010 | Morris et al. | |
| 2010/0263995 A1 | * | 10/2010 | Bi et al. | ..................... 200/50.25 |

FOREIGN PATENT DOCUMENTS

| | | |
|---|---|---|
| CN | 2571037 Y | 9/2003 |
| CN | 1725584 A | 1/2006 |
| CN | 200956502 Y | 10/2007 |
| DE | 9212149 U1 | 1/1994 |
| EP | 2015338 A2 | 1/2009 |
| EP | 2149949 A2 | 2/2010 |
| EP | 2469669 A1 | 6/2012 |
| WO | WO 2004040726 A2 | 5/2004 |

\* cited by examiner

*Primary Examiner* — Edwin A. Leon
*Assistant Examiner* — Iman Malakooti
(74) *Attorney, Agent, or Firm* — Leydig, Voit & Mayer, Ltd.

(57) ABSTRACT

A withdrawable unit system for an electric switching device, having a housing containing a access door, which gives access to all control elements of the unit and can be closed as tightly as required by international standards, such as DIN EN 60529. The withdrawable unit system optionally has a moveable unit capable of blocking and releasing the electrical switching device in and from at least three defined positions withdrawn, test and plugged-in by using a slide, a lever, and notches with dedicated notch blocking devices.

13 Claims, 11 Drawing Sheets

WITHDRAWABLE UNIT FOR AN ELECTRIC SWITCHING DEVICE

CROSS-REFERENCE TO RELATED APPLICATIONS

This application is a U.S. national phase application under 35 U.S.C. §371 of International Application No. of PCT/EP2011/073637 filed on Dec. 21, 2011, and claims benefit to European Patent Application No. 10196281.9, filed on Dec. 21, 2010. The international application was published in English on Jun. 28, 2012, as WO 2012/085116 A1 under PCT Article 21(2).

FIELD

The invention relates to a withdrawable unit system for an electric switching device. Such withdrawable unit systems are accessories for electric switching devices, especially power circuit breakers, which enable the user to withdraw the switching device out of a switchgear for maintenance, replacement or for demonstration of a viewable isolating distance. An additional advantage in using such withdrawable unit systems lies in the fact that the energy feed side of the switchgear must not be disconnected in such cases, i.e. live removal of the electric switching device is possible. The contacting of the main busbars has to be dimensioned for the maximum of the possible flowing current. This demands a big number of single contact elements in order to split the current on the one hand. On the other hand this demands a big contact pressure. In order to master this necessity, such withdrawable unit systems need a mechanism with a useful ratio. Even in case of a short circuit and due to the possible short circuit current the switching device and hence the withdrawable unit systems are charged with high forces.

BACKGROUND

Several possibilities of resisting such forces of withdrawable unit systems are known in the state of the art. WO 2004/040726 A2 discloses a device for fixing a circuit breaker in an insertion rack. The device includes at least one arresting unit which is connected to the insertion rack and belongs to the power circuit breaker. The arresting unit is connected to a control rod which is movable arranged on the insertion rack in such a way that it is displaceable from a locking position to an unlocking position and vice-versa. The control rod interacts with a system which moves the power circuit breaker in relation to the insertion rack. The device also includes a release device which can be displaced from the locking position of the control rod to the releasing position thereof and vice-versa by way of the power circuit breaker.

U.S. Pat. No. 5,837,949 discloses a withdrawable unit, which includes a movement bracket assembly adapted for mounting to a circuit breaker connecting apparatus, a guide assembly adapted for mounting to a circuit breaker unit, and a drive assembly adapted for mounting the bracket assembly and for causing the guide assembly to move with respect to the bracket assembly.

This withdrawable unit is able to move the circuit breaker from a position, where the main contacts and the usually existing auxiliary contacts for control and information signals are closed, i.e. the operating position, to a test position, i.e. a position, where only the auxiliary contacts are closed, whilst the main contacts are disconnected, and further to a withdrawn position, where all contacts are disconnected, and vice-versa. For the linear movement of the circuit breaker, a side wall of the withdrawable unit contains a spindle drive, which is drivable via a drive tool, insertable from the front of the withdrawable unit.

DE 92 12 149 U1 also discloses a device for fixing a power circuit breaker provided with a partition plate and in which a blocking lever, which is fixed on the withdrawable unit, can be brought by hand into a latched or an unlatched position, and the power circuit breaker is fixed in the latched position by way of a locking hook. The locking hook prevents a possible tipping movement of the power circuit breaker.

Analogous locking for a withdrawable unit equipped with a device for inserting the power circuit breaker does not, however, have to be undertaken by hand, which would then have the hidden risk of locking being forgotten.

The necessity of access to the control elements cause openings in the walls of the withdrawable unit. Therefore such withdrawable units do not pass superior types of protection, like protection against dust or water.

SUMMARY

In an embodiment, the invention provides a withdrawable unit system for an electric switching device. The system includes: a rack; a moveable unit configured to adjust the electric switching device; a moving element configured to move the electric switching device relatively to the rack; a locking device associated with the moveable unit; and a housing including a control side including an access door, the access door being openable and closable, and the door giving access to control elements of the withdrawable unit system, a contact to the moving element and the slide. The locking device includes a latching device including a lever including a first tail and a second tail. The latching device includes a counterpart device, configured as a counterpart of the lever, suitable to engage the lever. The latching device includes the slide, arranged movably on the moveable unit. The moveable unit is able to engage in at least three positions of the latching device, the at least three positions including a withdrawn position, a test position, and a plugged-in position of the electric switching device. The moving element includes a carriage configured to transmit driving power in action in order to move the electric switching device.

BRIEF DESCRIPTION OF THE DRAWINGS

Aspects of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5 view in the moveable unit in unlocked position plugged-in;

FIG. 10 detail catch, lever released from locked test position and moveable unit has moved further on in direction plugged-in;

DETAILED DESCRIPTION

An embodiment of the current invention provides a withdrawable unit system for an electric switching devise, which is able to pass tests due to superior types of protection against dust and water, like IP 40 pursuant DIN EN 60529, whilst it is able to move an electric switching device like a power circuit breaker from a operating position to an withdrawn position via a test position, where the unit is automatically secured in all three positions, and the unit can be unlocked from these secured positions in a safe and easy way, and vice-versa.

According to a first aspect, the present invention suggests a withdrawable unit system, which comprises at least a rack and a moveable unit having a housing which contains at least means for moving the electric switching device relatively to the rack, a slide, a locking device, and the housing having a control side with an access door, which is able to be opened and closed, and which gives access to all control elements of the withdrawable unit system, at least the contact to the means for moving the electric switching device relatively to the rack and the slide.

In a useful embodiment of the invention said access door can be closed densely.

Advantageously the access door according to the current invention interconnects with seals fixed at the edge of the access door or the frame of the access door.

The advantage of the withdrawable unit system with said access door in the control side wall of the housing of the moveable unit according to the current invention lies in the effective and reliable density of the access door. Hence it is possible to provide a withdrawable unit which passes tests due to superior types of protection against dust and water, like IP 40 pursuant DIN EN 60529.

According to a further aspect, the present invention suggests a withdrawable unit system for an electric switching device, comprising a rack and a moveable unit for adjusting the electric switching device, means for moving the electric switching device relatively to the rack, at least one locking device, associated with the moveable unit, wherein the locking device consisting of a latching device with a lever with a first and a second tail and a device as a counterpart of the lever suitable to engage the lever, and a slide, arranged movably on the moveable unit, wherein the moveable unit is able to engage in at least three positions of the latching device, which equates to at least an extended position, a test position and a plugged-in position of the electric switching device, and the means for moving the electric switching device relatively to the rack contains a carriage for the transmission of the driving power in action in order to move the electric switching device, wherein the lever latches during the movement of the carriage in every of the three positions in regarding notches in a device as counterpart of the lever. In case the carriage and hence the electric switching device shall be moved further, the lever has to be unlatched by actuating the slide.

The further advantage of the withdrawable unit system according to the current invention lies in the effective and reliable opening and re-closing of the regarding notches in the device acting as a counterpart of the lever. The lever and hence the switching device will be automatically blocked in every of the three defined positions.

A first preferred embodiment of the invention relates to a withdrawable unit system, wherein the moveable unit is arranged in a housing having a control side with an access door, which allows access to all control elements of the withdrawable unit system as well as to a racking tool and which can be closed densely in such way, that tests for superior types of protection against dust and water, like IP 40 pursuant DIN EN 60529, are passed and which holds the racking tool in its position even under shock and/or vibration circumstances. The racking tool is an operating device for the moving of the electric switching device. In a preferred embodiment the racking tool is a crank handle, which is stored behind the access door inside of the housing of the withdrawable unit system. Therefore no additional opening in the control side of the housing of the withdrawable unit system is necessary. The advantage of such arrangement lies in the prevention of possible leakage of the withdrawable unit system as well as the safe stowage of the racking tool regarding shock and vibration tests.

An advantageous further embodiment of the invention relates to a withdrawable unit system, wherein the device as counterpart of the lever contains notch blocking devices, which are able to rotate by their own axis and charged with the force of a spring. Due to said load the notch blocking devices have got a genuine position, where they block the regarding notch.

In an advantageous further embodiment of the current invention, the notch blocking devices protrudes over the edge of the device acting as a counterpart of the lever at least in case the notch blocking device is in its genuine position. In case the lever is moved along the device acting as a counterpart of the lever far enough, it will adjoin a notch blocking device. It is able to rotate this device until it releases the access to the regarding notch, whereon the lever will snap in this notch. When released by activating the slide, the notch blocking device will remove in its genuine position and prevent the lever from re-snapping in again when the slide is no longer activated and the carriage is not moved further yet. If the lever now is moved further on, it will take the notch blocking device along in rotating it until it is beyond the regarding notch. Now the edge of the lever will slide down the notch blocking device, whereon it will remove to its genuine position.

Particular advantageously in this embodiment is the possibility of a one hand operation. To move the carriage further on after releasing the lever from a notch, it is not necessary to move the carriage further in parallel to activating the slide. On the contrary the actions can be done one after another, first activating the slide, releasing the slide and subsequent move the carriage.

Additional advantages, special features and practical refinements of the invention can be gleaned from the subordinate claims and from the presentation below of preferred embodiments making reference to the figures.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain aspects commensurate in scope with the disclosed embodiments are set forth below.

Figure 1:
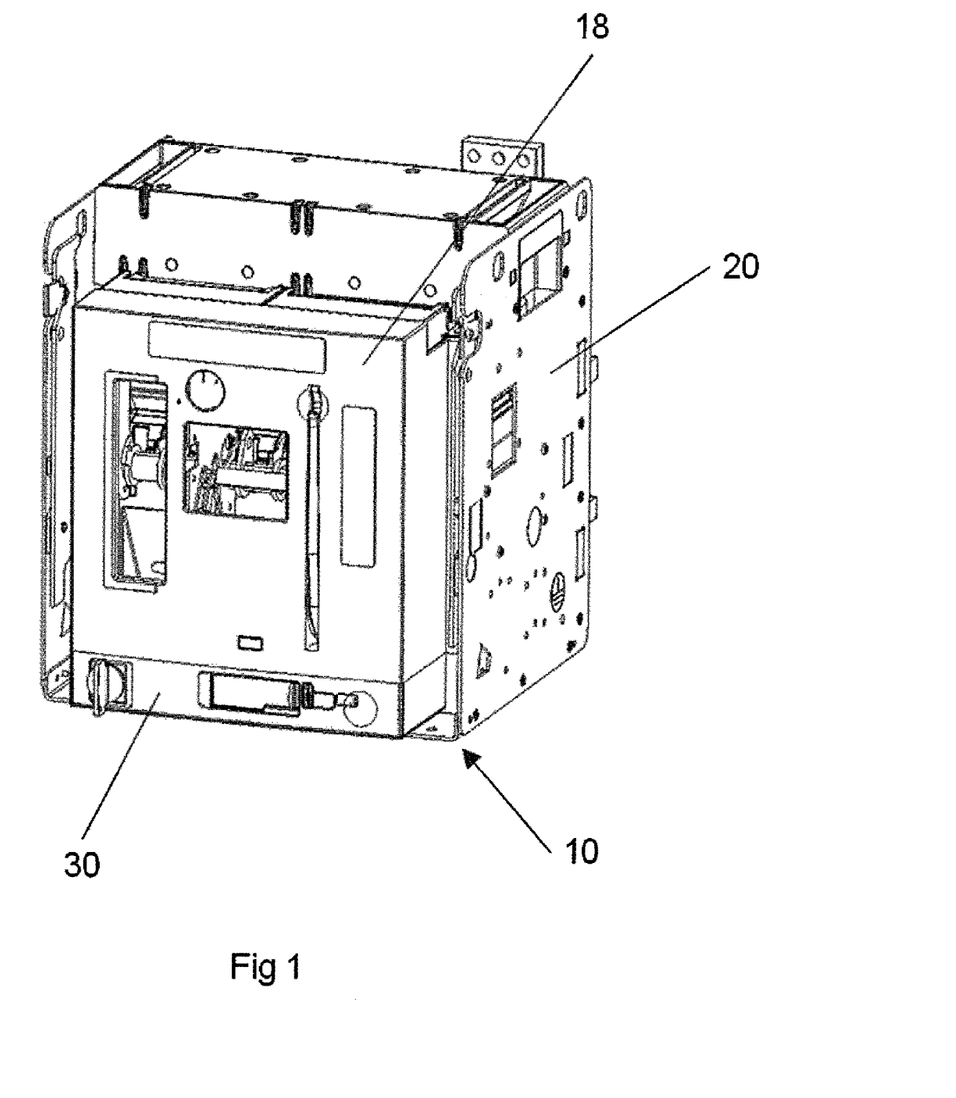
FIG. 1 withdrawable unit with electrical switching device.

In FIG. 1 is shown the withdrawable unit system 10 assembled with a power circuit breaker 18. The withdrawable unit system contains of a rack 20 and a moveable unit 30.

Figure 2:
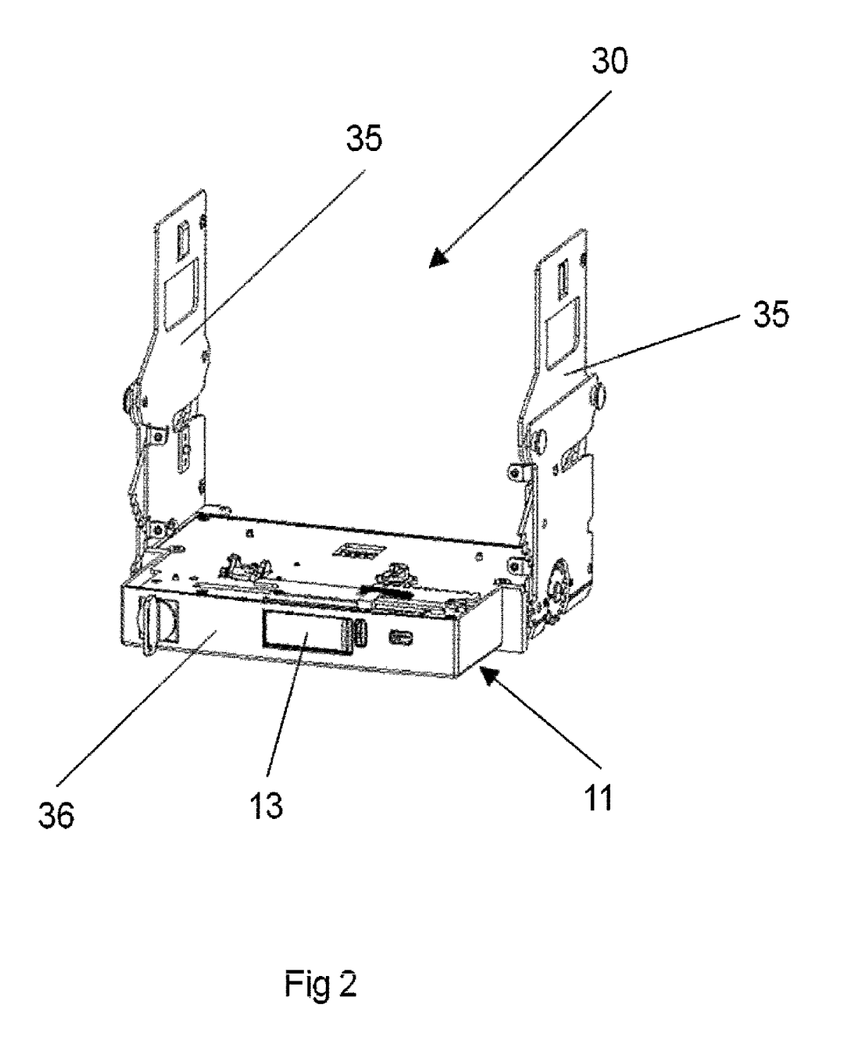
FIG. 2 electrical switching device with moveable unit, but without rack.

FIG. 2 shows moveable unit 30 without electrical switching device and without rack. The moveable unit 30 contains of a housing 11 having walls, especially a control side wall 36, and upper side walls 35. Furthermore an access door 13 is integrated in the control side wall 36 of the housing.

Figure 3:
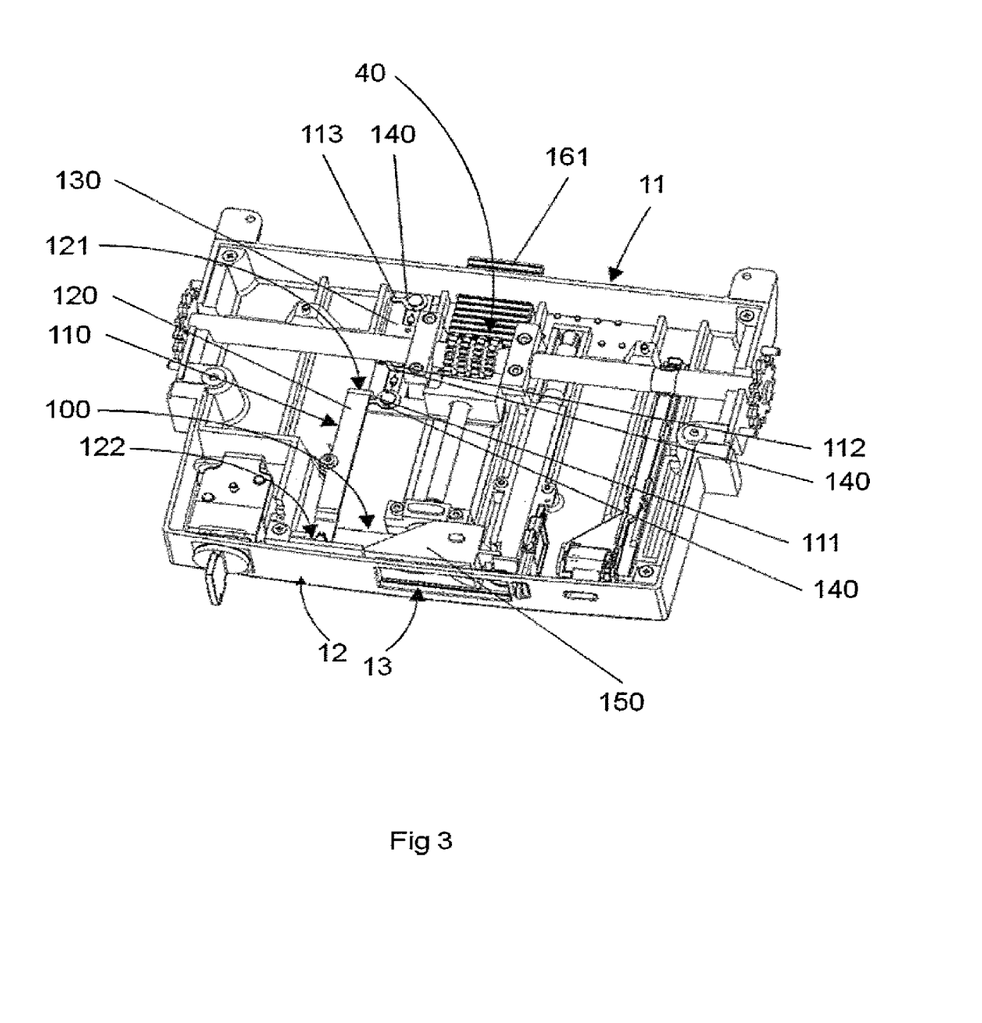
FIG. 3 moveable unit without electrical switching device and without rack.
Figure 4:
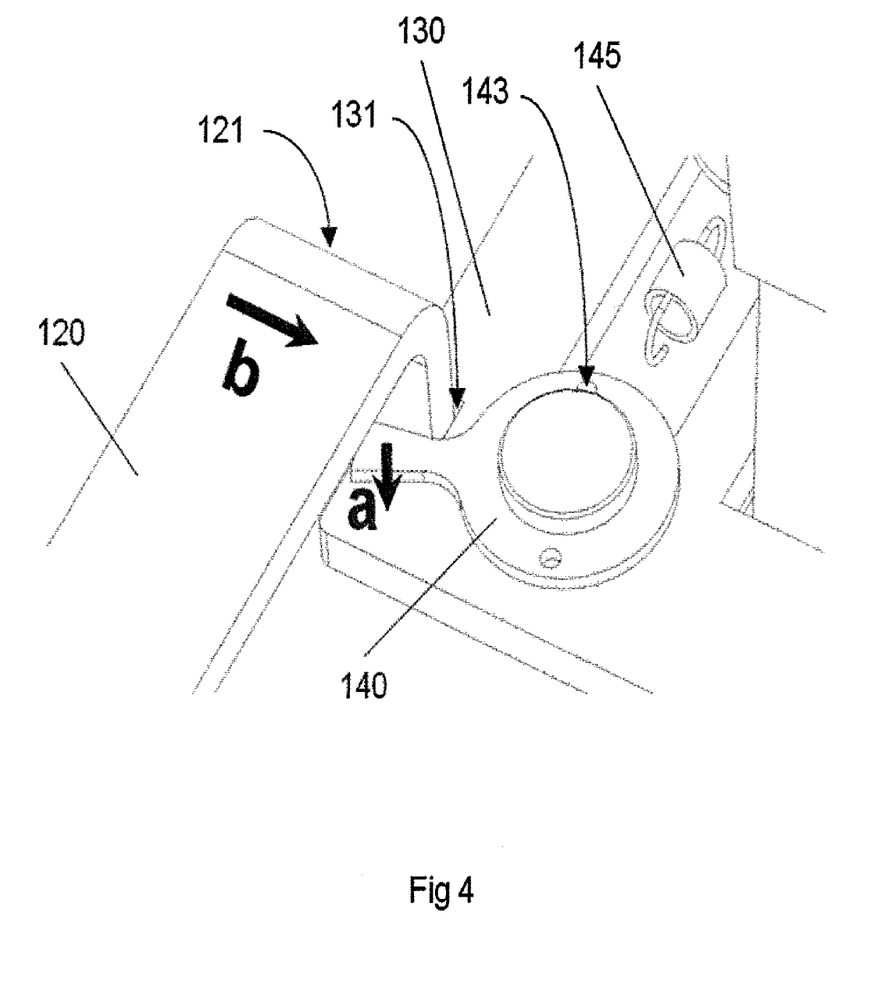
FIG. 4 view in the moveable unit in locked position withdrawn.

FIG. 3 offers a view in the housing 11 of the moveable unit 30 through the removed cover plate. The moveable unit 30 has got means for moving the electric switching device relatively to the rack 40 containing a carriage 161 for the transmission of the driving power in action. Furthermore it has got a locking device 100 consisting of a latching device 110 with a lever 120 with a first 121 and a second tail 122 and a device 130 as a counterpart of the lever 120 suitable to engage the lever 120, and a slide 150, arranged movably on the moveable unit 30, wherein the moveable unit 30 is able to engage in at least three positions 111, 112, 113 of the latching device 110, which equates to at least a withdrawn position, a test position and a plugged-in position of the electric switching device 18. The slide 150 is accessible through the access door 13. The lever is locked in position withdrawn 111 (see FIG. 4 for details). The first tail 121 of the lever 120 has turned the regarding notch blocking device 140 in the direction of its movement like indicated by arrow a. Therefore the regarding notch 131 in the device 130 as a counterpart to the lever 120 wasn't blocked any longer and the first tail 121 of the lever 120 was able to slip in the notch 131, indicated by arrow b.

The notch blocking device 140 is charged with force of a spring 145, being effective at a spring access hole 143. Due to practical reasons the springs 145 are always indicated, but not drawn in their realistic design. Hence the springs 145 are not drawn as accessed to the spring access holes 143.

Figure 5:
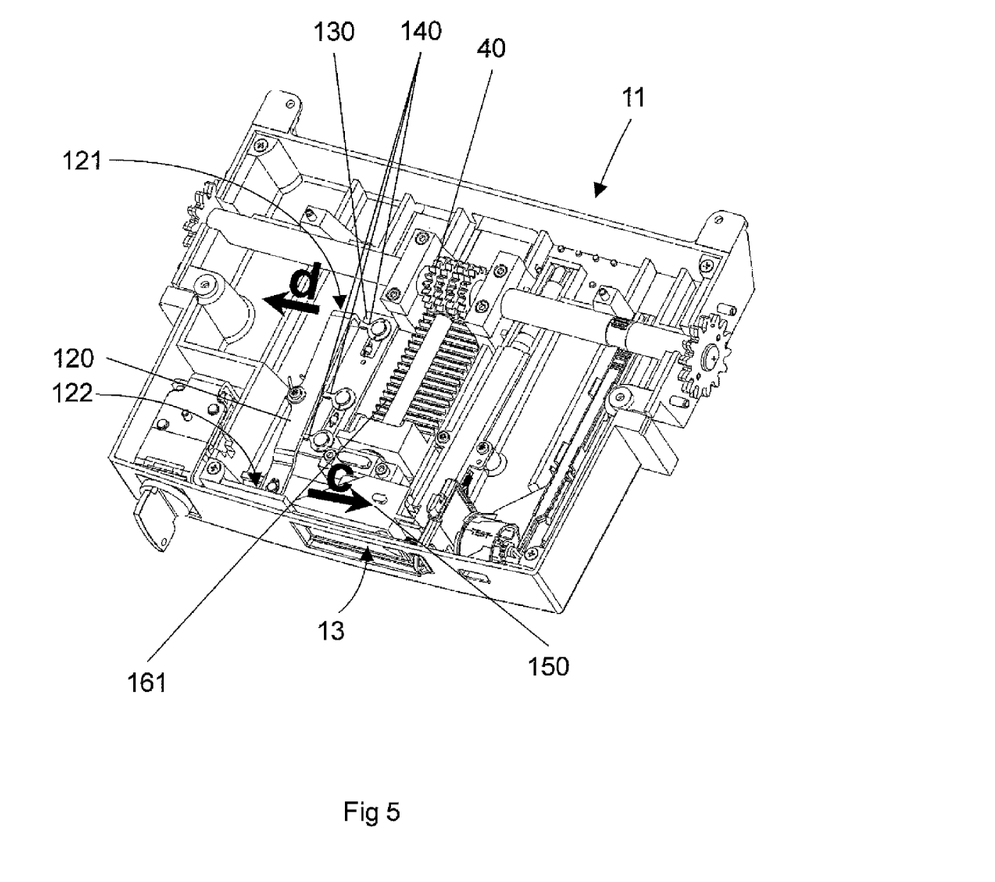
Figure 7:
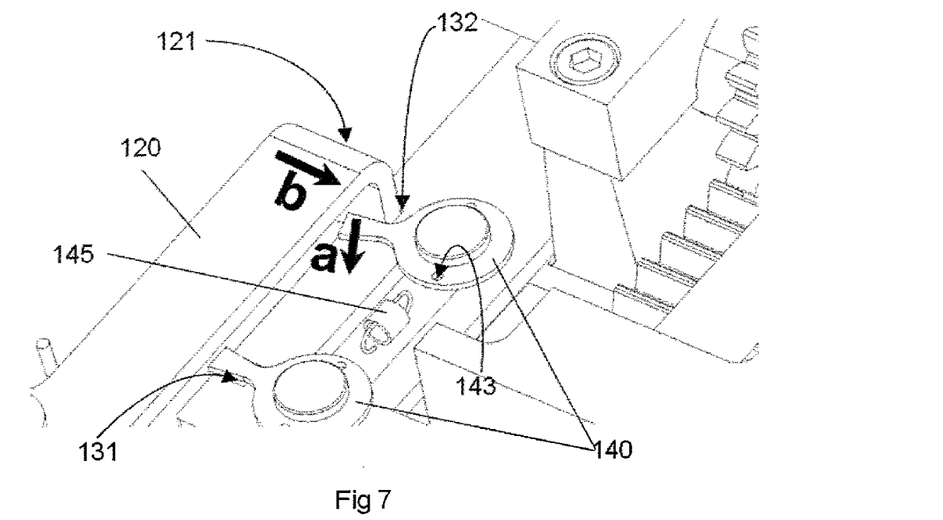
FIG. 7 detail catch, lever locked in test position.
Figure 8:
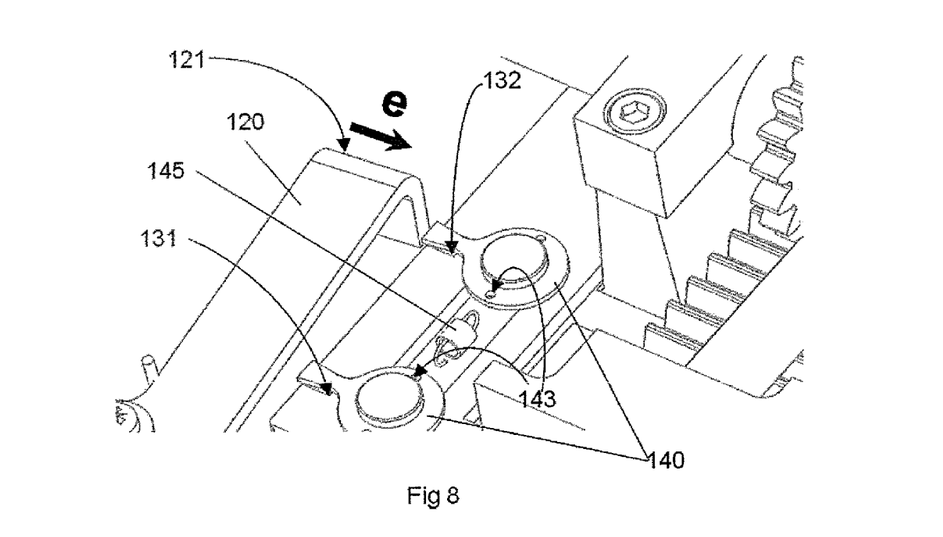
FIG. 8 detail catch, lever not locked, notch blocking device in genuine position.
Figure 9:
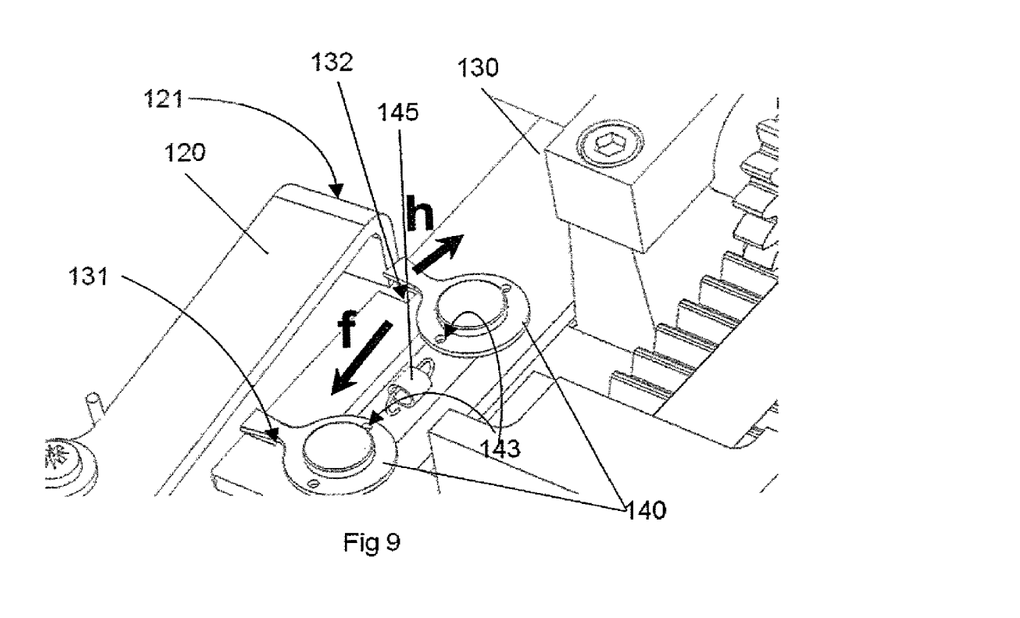
FIG. 9 detail catch, lever released from locked test position.

FIG. 5 offers the same view in the housing 11 of the moveable unit 30 through the removed cover plate. Here the lever is in position plugged-in 113, but due to the blocked regarding notch 133 not locked (see FIG. 7 for details). The lever 120 was blocked in position plugged-in, but in the situation shown the slide 150 was activated in direction c, hence the first edge 121 of the lever 120 moved in direction d, and the notch blocking device 140 has snapped back in its genuine position due to the force of the spring 145 (look FIG. 7 for details). After releasing the slide 150 the first edge 121 of the lever 120 pushes against the front end of the notch blocking device 140 due to its charge of a twister, indicated with arrow e in FIG. 7.

It is understood that instead of the springs 145 there are other possibilities imaginable for snapping back the notch blocking devices 140 in their genuine positions, such as clock springs, torsion springs or devices out of elastic materials such as rubber for example.

Figure 6:
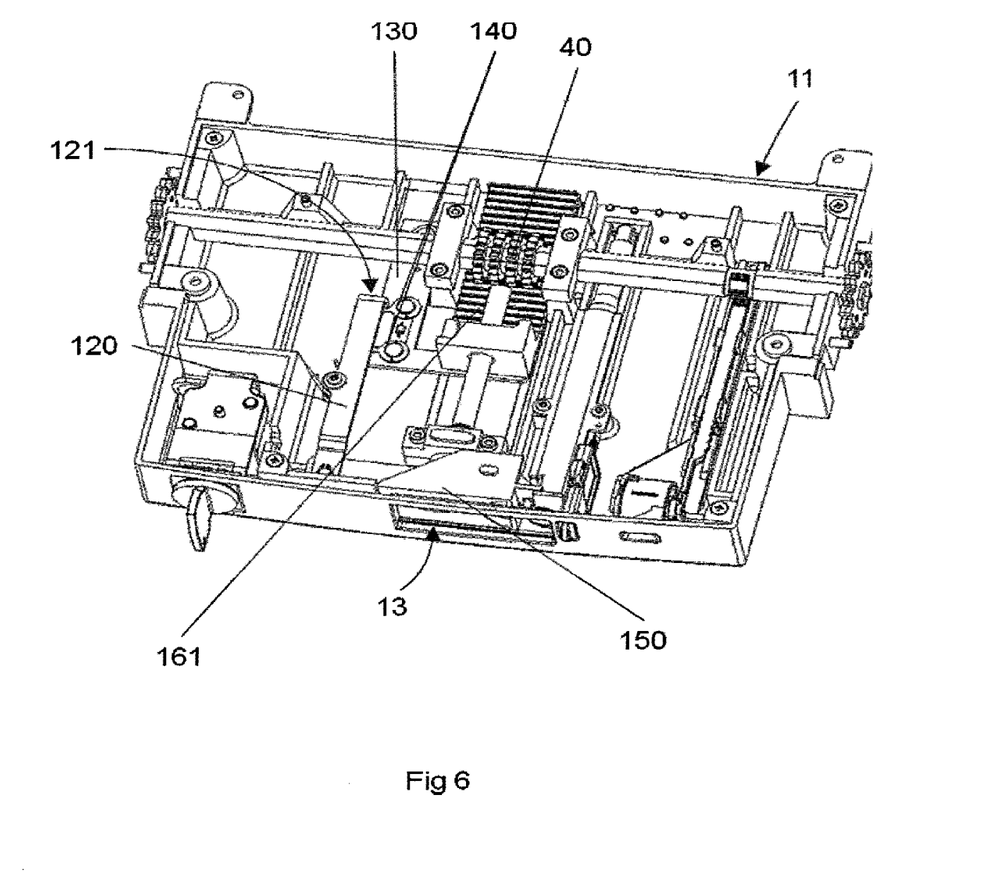
FIG. 6 view in the moveable unit in locked position test.

FIG. 6 again offers the same view in the housing 11 of the moveable unit 30 through the removed cover plate. Here the lever 120 is in the blocked position test 112. Like in the first situation shown in FIGS. 3 and 4 the first tail 12) of the lever 120 has turned the regarding notch blocking device 140 in the direction of its movement like indicated by arrow a (for details see FIG. 7). Therefore the regarding notch 132 in the device 130 as a counterpart to the lever 120 wasn't blocked any longer and the first tail 121 of the lever 120 was able to slip in the notch 132, indicated by arrow b.

Figure 10:
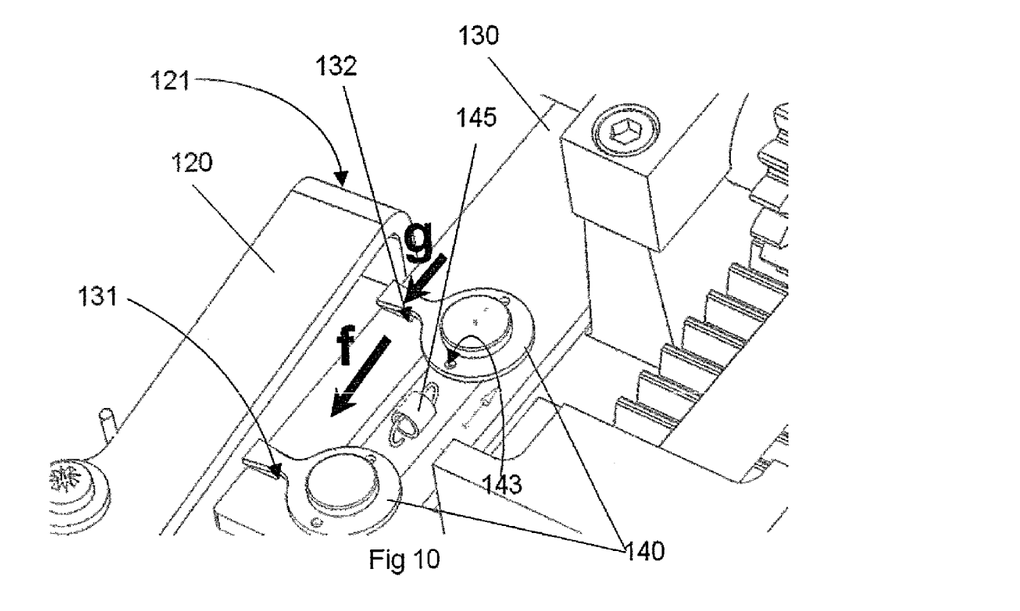

The movement of the notch blocking notches 140 due to the movement relative between the lever 120 respectively the first tail 121 of the lever 120 and the carriage 161, respectively the device 130 as a counterpart of the lever 120 shall be described with the help of FIG. 10: In case the carriage 161 move from the plugged-in position 113 to the test position 112 as indicated by the arrow f, the device 130 as a counterpart of the lever 120 will move in the same way due to the fact that these parts a fixed together. The lever 120 is fixed on the moveable unit 30 and stands still regarding the carriage 161. The first edge 121 of the level is pushed against the edge of the device 130 as a counterpart of the lever 120, due to the fact that a twister charges its force to the lever 120. The notch blocking devices 140 are able to rotate by their own axis and are charged with the force of a spring 145. Due to said load the notch blocking devices 140 have got their genuine position where they block the regarding notch. The notch blocking devices 140 protrudes over the edge of the device 130 acting as a counterpart of the lever 120 at least in case the notch blocking device is in its genuine position. In case the first edge 121 of the lever 120 is moved along the device acting as a counterpart of the lever 120 far enough, it will adjoin the protruded edge of a notch blocking device 140. It is able to rotate this device 140 in the same direction as indicated by arrow g, until it releases the access to the regarding notch 131, 132, 133, whereupon the lever 120 will snap in this notch 131, 132, 133.

When the lever 120 is released by activating the slide 150, the notch blocking device 140 will remove in its genuine position and prevent the lever 120 from re-snapping in again when the slide 150 is no longer activated and the carriage 161 is not moved further yet. If the lever 120 now is moved further on, it will take the notch blocking device 140 along in rotating it until it is beyond the regarding notch 131, 132, 133, as shown in FIG. 10. Now the first edge 121 of the lever 120 will slide down the notch blocking device 140, whereupon the notch blocking device 140 will remove to its genuine position.

Figure 11:
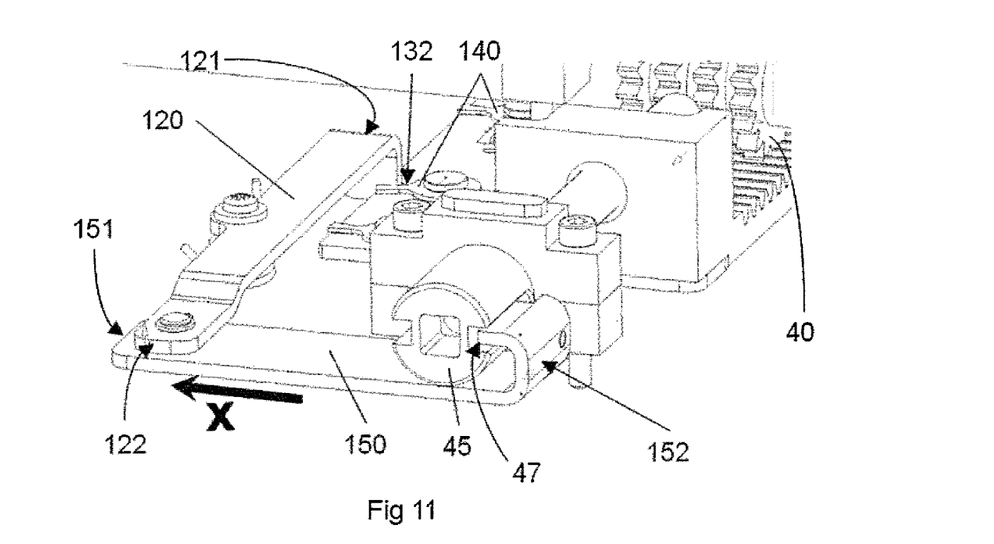
FIG. 11 detail catch, lever locked in test position, spindle blocked.

In an advantageous further embodiment of the current invention, shown in FIG. 11, the first edge 121 of the lever 120 is blocked in the test position 112. The slide 150 with its first edge 151 is pivotable connected to the second edge 122 of the lever 120. The means for moving the electric switching device relatively to the rack 40 are driven by a spindle 45. Said spindle 45 has got at least one notch 47, and the slide 150 has got a second edge 152 designed in such a way, that it is able to fit in the notch 47 of the spindle 45. The at least one notch 47 in the spindle 45 is positioned in such a way, that the second edge 152 of the slide 150 will fit in said notch in case the electric switching device 18 is in a defined position 111, 112, 113. In case, the lever 120 is in a blocked position 111, 112, 113, it moves the slide 150 in x direction as that the second edge 152 of the slide 150 snaps the notch 47 of the spindle 45. Hence the spindle is blocked.

Figure 12:
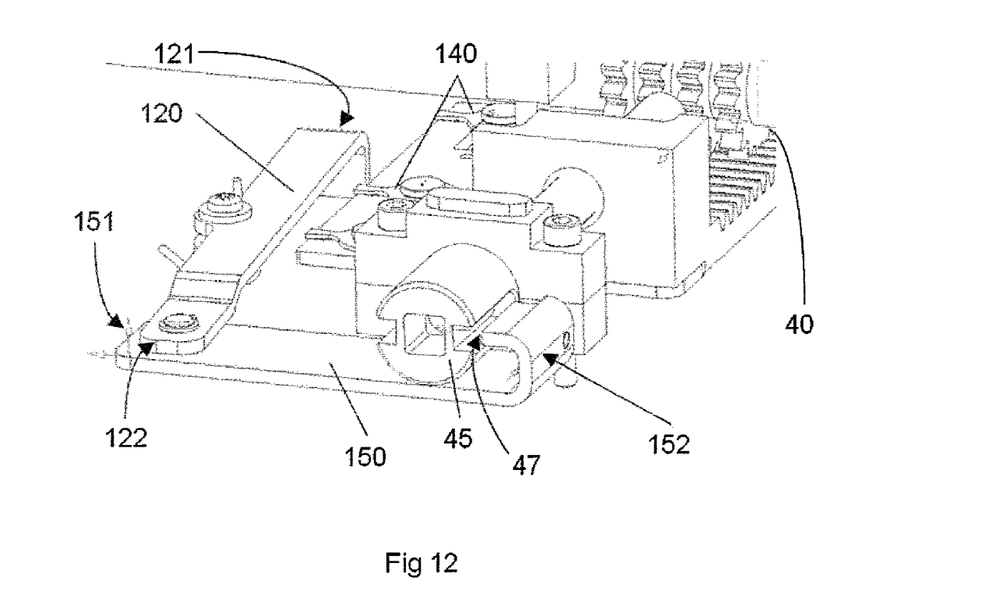
FIG. 12 detail catch, lever not locked, spindle not blocked.

In FIG. 12 the same embodiment of the current invention like shown in the previous FIG. 11 is demonstrated, but the electric switching device 18 and hence the first edge 121 of the lever 120 is not blocked in one of the defined positions 111, 112, 113. Hence the second edge 152 of the slide 150 is not in mesh with the notch 47 in the spindle 45 and the spindle is not blocked, i.e. it is rotatable.

Figure 13:
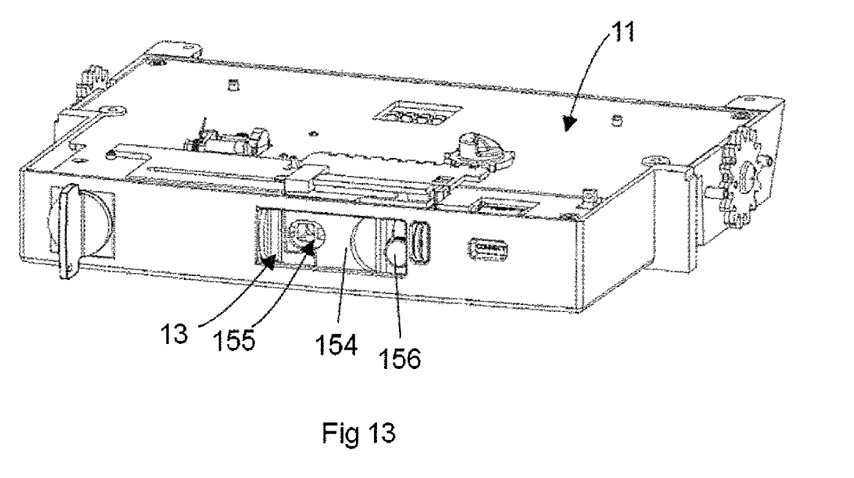
FIG. 13 moveable unit without switching device and upper side walls. access door opened, control elements and racking tool visible.

In relation to a further aspect of the current invention, FIG. 13 shows the housing 11 of the moveable unit 30 comprising an access door 13 in the wall of the control side 12 of the withdrawable unit system. The access door 13 is drawn in the opened position. The slide 150 has got a handle 154 with an access flap for fingers. Furthermore the slide 150 has got an elongated hole 155 which allows access to the spindle. All control elements 154, 155 of the withdrawable unit system 10 as well as the racking tool 156 are accessible through the opened access door 13. The racking tool 156 is stored in a clamp inside the housing of the movable unit. In case the related electrical switching device 18 is in the OFF position. The related electrical switching device 18 can only turned in the ON position in case the access door 13 is closed.

Figure 14:
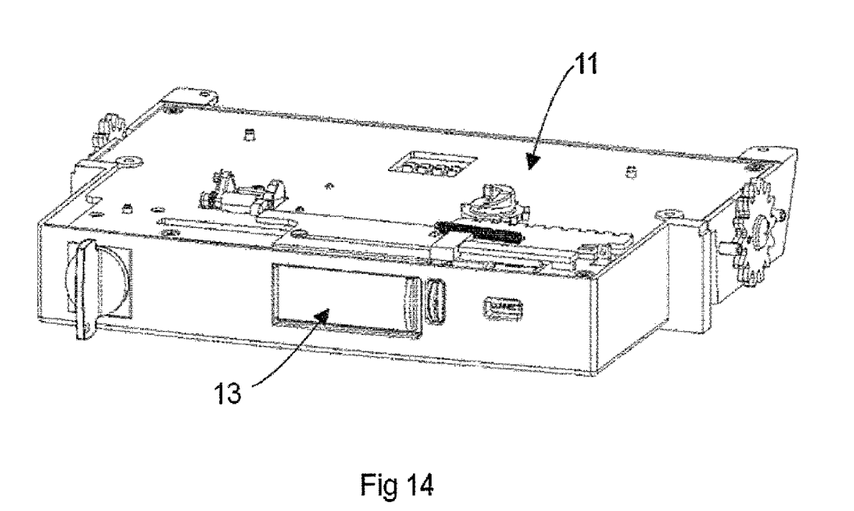
FIG. 14 moveable unit without switching device and upper side walls. access door closed.

In FIG. 14 the housing 11 of the moveable unit is shown again. The access door 13 is closed. No control element 154, 155 of the withdrawable unit system 10, nor the racking tool 156, is accessible.

Figure 15:
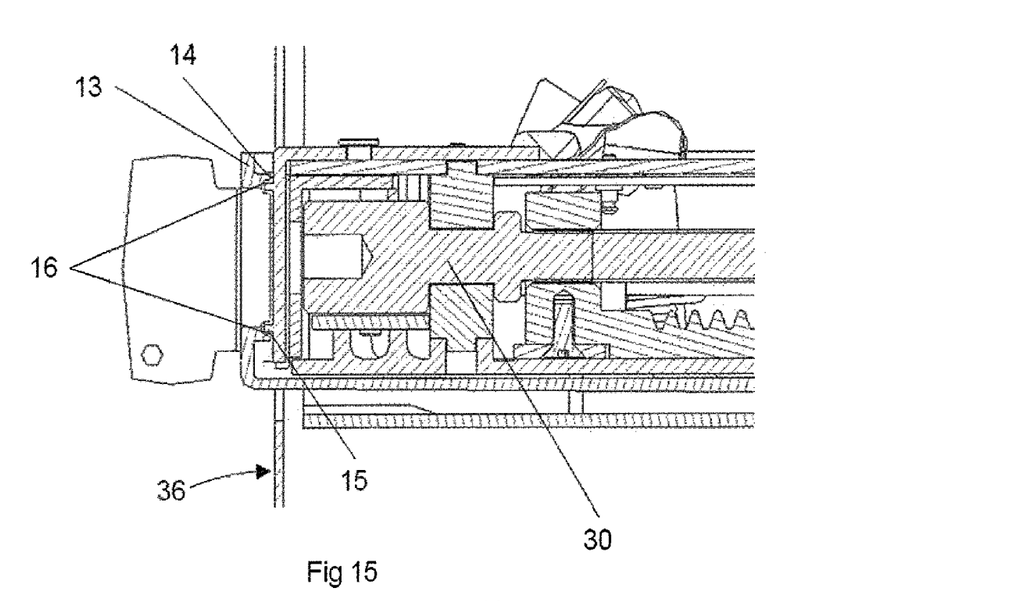
FIG. 15 sectional drawing of the access door with seals.

In a further embodiment of the current invention shown in FIG. 15 the access door 13 has got seals 16 in order to give the possibility to close the access door 13 as dense as it may be claimed from certain standards, such as DIN EN 60529 for example. The seals 16 can be fixed at edge of the access door 13 or the frame of the access door 13.

Figure 16:
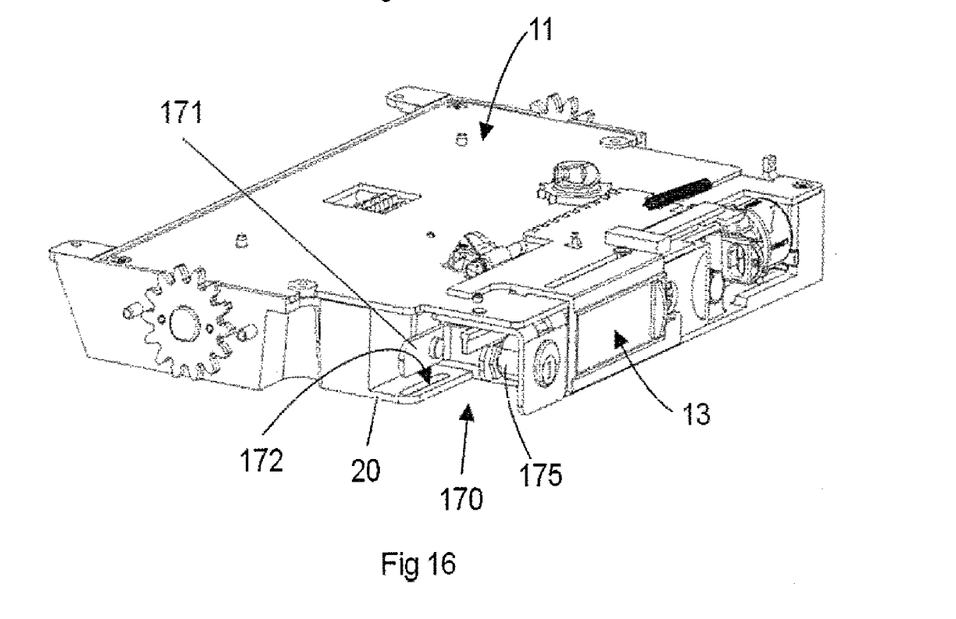
FIG. 16 keylock device of moveable unit without switching device and upper side walls and without front wall.

In an advantageous further embodiment of the current invention, shown in FIG. 16, the housing 11 contains a device 170 for locking up the withdrawable unit system 10 in such a way that the access door 13 cannot be opened and the moveable unit system 10 cannot be withdrawn. The device 170 contains a cylinder lock 175, which activates a lever 171. As a counterpart of this lever 171, the rack 20 has an elongated hole 172 designed in such a way that the lever 171 can fit in said elongated hole 172. Several cylinder locks 175 are imaginable. The cylinder lock 175 can only be activated in case the moveable unit 30 is in the position withdrawn 111.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the attached claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise.

List of Reference Numerals
    10 withdrawable unit system
    11 housing
    12 control side of the withdrawable unit system 10
    13 access door
    14 edge of the access door 13
    15 frame of the access door 13
    16 seal
    18 electric switching device
    20 rack of the withdrawable unit system 10
    30 moveable unit of the withdrawable unit system 10
    35 upper side wall
    36 control side wall of the housing 11
    40 means for moving the electric switching device relatively to the rack 20
    45 spindle
    100 notch in spindle
    100 locking device
    110 latching device
    111 withdrawn position
    112 test position
    113 plugged-in position
    120 lever
    121 first tail of lever 120
    122 second tail of lever 120
    130 device as a counterpart of the lever 120
    131 notch in the device 130 corresponding to the withdrawn position 111
    132 notch in the device 130 corresponding to the test position 112
    133 notch in the device 130 corresponding to the plugged-in position 113
    140 notch blocking devices
    141 axis of the notch blocking devices 140
    143 spring access hole
    145 spring
    150 slide
    151 first edge of the slide 150
    152 second edge of the slide 150
    154 handle
    155 elongated hole
    156 racking tool
    161 carriage
    170 device for locking up the withdawable unit system 10
    171 lever
    172 elongated hole
    175 cylinder lock

The invention claimed is:

1. A withdrawable unit system for an electric switching device, the system comprising:
    a rack;
    a moveable unit configured to adjust the electric switching device;
    a moving element configured to move the electric switching device relatively to the rack;
    a locking device associated with the moveable unit; and
    a housing including a control side including an access door, the access door being openable and closable, and the door giving access to control demerits of the withdrawable unit system, a contact to the moving element, and the slide, wherein the locking device includes a latching device including a lever including a first tail and a second tail, wherein the latching device includes a counterpart device, configured as a counterpart of the lever, suitable to engage the lever, wherein the latching device includes the slide, the slide being arranged movably on the moveable unit and connected to the latching device in such a way that it is able to unlatch the locking device, wherein the moveable unit is able to engage in at least three positions of the latching device, the at least three positions including a withdrawn position, a test position, and a plugged-in position of the electric switching device, wherein the moving element includes a carriage configured to transmit driving power in action in order to move the electric switching device.

2. The system of claim 1, wherein the access door can be closed tightly.

3. The system of claim 2, wherein the access door interconnects with seals fixed at an edge of the access door or on a frame of the access door.

4. The system of claim 1, wherein the latching device is configured such that it can be charged with a three in order to push the second tail of the lever towards the counterpart device.

5. The system of claim 4, wherein the counterpart device includes at least three notches corresponding to the at least three positions of the latching device.

6. The system of claim 5, wherein the counterpart device includes at least three notch blocking devices configured to be able to block the notches.

7. The system of claim 6, wherein the at least three notch blocking devices are arranged on the carriage such that the at least three notch blocking devices can rotate around their own axis and can be activated by the lever.

8. The system of claim 7, wherein the at least three notch blocking devices include restoring elements configured to maintain and return the at least three notch blocking devices to a position blocking a respective notch in a configuration in which the lever does not rotate the at least three notch blocking devices.

9. The system of claim 8, wherein the restoring elements are springs.

10. The system of claim 1, wherein the moving element is able to interact with a feature connected with the slide in order to block the moving element in a configuration in which the moveable unit is engaged in one of the at least three positions of the latching device.

11. The system of claim 1, wherein the slide includes a handle configured for manual operation, wherein the handle is located such that it can he reached through the access door.

12. The system of claim 1, further comprising:
a securing device configured to secure the withdrawable unit system in any of the at least three positions.

13. The system of claim 1, further comprising:
a locking device configured to lock up the withdrawable unit system such that the withdrawable unit system cannot be withdrawn in a configuration in which the locking device is locked.

\* \* \* \* \*